US009122751B2

(12) United States Patent
Chen et al.

(10) Patent No.: US 9,122,751 B2
(45) Date of Patent: Sep. 1, 2015

(54) METHOD OF TAGGING INSTANT MESSAGING (IM) CONVERSATIONS FOR EASY INFORMATION SHARING

(75) Inventors: Li Chen, Cary, NC (US); John R. Hind, Raleigh, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2115 days.

(21) Appl. No.: 11/952,741

(22) Filed: Dec. 7, 2007

(65) Prior Publication Data

US 2009/0150397 A1 Jun. 11, 2009

(51) Int. Cl.
*G06F 7/00* (2006.01)
*G06F 17/30* (2006.01)

(52) U.S. Cl.
CPC .... *G06F 17/30722* (2013.01); *G06F 17/30876* (2013.01)

(58) Field of Classification Search
CPC .................................................. G06F 17/30876
See application file for complete search history.

(56) References Cited

U.S. PATENT DOCUMENTS

| | | | |
|---|---|---|---|
| 5,339,388 A | 8/1994 | Bates et al. | |
| 5,615,269 A | 3/1997 | Micali | |
| 6,076,100 A | 6/2000 | Cottrille et al. | |
| 6,199,070 B1 | 3/2001 | Polo-Wood et al. | |
| 6,301,609 B1 | 10/2001 | Aravamudan et al. | |
| 6,324,569 B1 | 11/2001 | Ogilvie et al. | |
| 6,487,583 B1 | 11/2002 | Harvey et al. | |
| 6,532,218 B1 | 3/2003 | Shaffer et al. | |
| 6,587,127 B1 | 7/2003 | Leeke et al. | |
| 6,606,644 B1 * | 8/2003 | Ford et al. | 709/203 |
| 6,631,412 B1 | 10/2003 | Glasser et al. | |
| 6,651,086 B1 | 11/2003 | Mamber et al. | |
| 6,757,365 B1 | 6/2004 | Bogard | |
| 6,760,749 B1 | 7/2004 | Dunlap et al. | |
| 6,956,593 B1 * | 10/2005 | Gupta et al. | 715/751 |
| 7,034,691 B1 | 4/2006 | Rapaport et al. | |
| 7,080,139 B1 | 7/2006 | Briggs et al. | |
| 7,111,044 B2 | 9/2006 | Lee | |
| 7,177,817 B1 | 2/2007 | Khosla et al. | |
| 7,188,143 B2 | 3/2007 | Szeto | |
| 7,191,400 B1 | 3/2007 | Buvac et al. | |
| 7,263,526 B1 | 8/2007 | Busey et al. | |
| 7,269,794 B2 | 9/2007 | Martinez et al. | |

(Continued)

OTHER PUBLICATIONS

IBM, "Dynamic Rule-based Management of IM Sessions", Nov. 1, 2006, IBM.*

(Continued)

*Primary Examiner* — Ajith Jacob
(74) *Attorney, Agent, or Firm* — Jeffrey T. Holman

(57) ABSTRACT

A method, system and computer program product for selecting and tagging content within an instant messaging (IM) session. The content is selected utilizing a contextual pointer, tagged with a subject and/or key words, then assigned a uniform resource locator (URL), and stored as an IM transcript. A search system allows the IM transcript and/or selected content to be indexed according to the tag, title, and word(s)/phrase(s) selected within the content. The IM transcript is retrieved from a location within the network via the assigned URL. IM users may assign accessibility privileges to the URL of the IM transcript, allowing selected content to be shared via a community and/or corporate network. Private access privileges may be assigned to offer full IM transcript protection.

20 Claims, 7 Drawing Sheets

(56) References Cited

U.S. PATENT DOCUMENTS

| | | | |
|---|---|---|---|
| 7,328,214 B2 | 2/2008 | Yuan et al. | |
| 7,383,310 B1* | 6/2008 | Lyle et al. | 709/207 |
| 7,562,287 B1* | 7/2009 | Goldstein et al. | 715/201 |
| 7,596,596 B2* | 9/2009 | Chen et al. | 709/204 |
| 7,689,649 B2* | 3/2010 | Heikes et al. | 709/204 |
| 2002/0035605 A1 | 3/2002 | McDowell et al. | |
| 2002/0059566 A1 | 5/2002 | Delcambre et al. | |
| 2002/0062347 A1 | 5/2002 | Low et al. | |
| 2002/0069249 A1 | 6/2002 | Pedersen | |
| 2002/0112004 A1 | 8/2002 | Reid et al. | |
| 2002/0120939 A1 | 8/2002 | Wall et al. | |
| 2002/0178163 A1 | 11/2002 | Mayer | |
| 2002/0188777 A1 | 12/2002 | Kraft et al. | |
| 2003/0014488 A1 | 1/2003 | Dalal et al. | |
| 2003/0023684 A1 | 1/2003 | Brown et al. | |
| 2003/0034999 A1 | 2/2003 | Coughlin, III et al. | |
| 2003/0208639 A1 | 11/2003 | Stern et al. | |
| 2003/0229722 A1 | 12/2003 | Beyda | |
| 2003/0233420 A1 | 12/2003 | Stark et al. | |
| 2004/0002049 A1 | 1/2004 | Beavers et al. | |
| 2004/0037406 A1 | 2/2004 | Gourraud et al. | |
| 2004/0078596 A1* | 4/2004 | Kent et al. | 713/201 |
| 2004/0127241 A1 | 7/2004 | Shostak | |
| 2004/0128356 A1* | 7/2004 | Bernstein et al. | 709/206 |
| 2004/0174863 A1 | 9/2004 | Caspi et al. | |
| 2004/0174896 A1 | 9/2004 | Caspi et al. | |
| 2004/0174905 A1 | 9/2004 | Caspi et al. | |
| 2004/0175096 A1 | 9/2004 | Caspi et al. | |
| 2004/0175097 A1 | 9/2004 | Caspi et al. | |
| 2004/0177371 A1 | 9/2004 | Caspi et al. | |
| 2004/0177375 A1 | 9/2004 | Caspi et al. | |
| 2004/0177376 A1 | 9/2004 | Caspi et al. | |
| 2004/0215731 A1 | 10/2004 | Szeto | |
| 2004/0224772 A1 | 11/2004 | Canessa et al. | |
| 2004/0243922 A1 | 12/2004 | Sirota et al. | |
| 2004/0249650 A1 | 12/2004 | Freedman et al. | |
| 2004/0260710 A1 | 12/2004 | Marston et al. | |
| 2005/0004985 A1* | 1/2005 | Stochosky | 709/205 |
| 2005/0021624 A1 | 1/2005 | Herf et al. | |
| 2005/0024387 A1 | 2/2005 | Ratnakar et al. | |
| 2005/0034079 A1 | 2/2005 | Gunasekar et al. | |
| 2005/0037739 A1 | 2/2005 | Zhong | |
| 2005/0050222 A1* | 3/2005 | Packer | 709/238 |
| 2005/0097470 A1 | 5/2005 | Dias et al. | |
| 2005/0102361 A1 | 5/2005 | Winjum et al. | |
| 2005/0108332 A1 | 5/2005 | Vaschillo et al. | |
| 2005/0164154 A1 | 7/2005 | Solomon | |
| 2005/0234883 A1 | 10/2005 | Szeto et al. | |
| 2005/0234885 A1 | 10/2005 | Szeto et al. | |
| 2005/0235034 A1* | 10/2005 | Chen et al. | 709/206 |
| 2005/0262199 A1 | 11/2005 | Chen et al. | |
| 2005/0289220 A1* | 12/2005 | Chen et al. | 709/206 |
| 2006/0004702 A1 | 1/2006 | St. John et al. | |
| 2006/0026237 A1* | 2/2006 | Wang et al. | 709/206 |
| 2006/0041828 A1 | 2/2006 | King et al. | |
| 2006/0047635 A1 | 3/2006 | Kraenzel et al. | |
| 2006/0074727 A1 | 4/2006 | Briere | |
| 2006/0161631 A1 | 7/2006 | Lira | |
| 2006/0161852 A1 | 7/2006 | Chen et al. | |
| 2006/0167994 A1* | 7/2006 | Chen et al. | 709/204 |
| 2006/0277474 A1 | 12/2006 | Robarts et al. | |
| 2006/0282819 A1* | 12/2006 | Graham et al. | 717/113 |
| 2007/0027954 A1 | 2/2007 | Chen et al. | |
| 2007/0044017 A1* | 2/2007 | Zhu et al. | 715/530 |
| 2007/0162589 A1* | 7/2007 | Riddle | 709/223 |
| 2008/0010344 A1* | 1/2008 | Wherry et al. | 709/204 |
| 2008/0109406 A1* | 5/2008 | Krishnasamy et al. | 707/3 |
| 2008/0147794 A1* | 6/2008 | Limberg | 709/204 |
| 2009/0019377 A1 | 1/2009 | Chen et al. | |
| 2009/0030984 A1 | 1/2009 | Chen et al. | |

OTHER PUBLICATIONS

IBM, "Method to Provide History to Instant Message Members Invited to Join a Conference After the Session Has Started", Jul. 17, 2006, IBM.*

Final Office Action for U.S. Appl. No. 12/177,270, (May 21, 2010), 17 pages.

Non-Final Office Action for U.S. Appl. No. 12/177,277, (May 28, 2010), 15 pages.

Non-Final Office Action for U.S. Appl. No. 11/039,508, (May 11, 2009), 11 pages.

Non-Final Office Action for U.S. Appl. No. 11/039,508, (May 26, 2010), 11 pages.

Final Office Action for U.S. Appl. No. 11/039,508, (Dec. 1, 2008), 8 pages.

Final Office Action for U.S. Appl. No. 10/824,811, (Mar. 17, 2009), 24 pages.

Non-Final Office Action for U.S. Appl. No. 10/824,811, (Aug. 21, 2009), 14 pages.

Non-Final Office Action for U.S. Appl. No. 10/824,811, (Sep. 3, 2008), 18 pages.

Notice of Allowance for U.S. Appl. No. 10/875,881, (Dec. 31, 2008), 6 pages.

Final Office Action for U.S. Appl. No. 10/875,881, (Sep. 26, 2008), 7 pages.

Non-Final Office Action for U.S. Appl. No. 11/032,884, (Apr. 30, 2009), 10 pages.

Final Office Action for U.S. Appl. No. 11/032,884, (Dec. 2, 2008), 12 pages.

* cited by examiner

IM Bookmark 400

<john@us.ibm.com>

Title 402 | Corporate Policy 10AB |

Tag 417 | productivity suggestions |

Tools 406 | B | *I* | U | ⅓≡ | ≔ | Font ▼ | 14 ▼ |

Description (optional) 408

Brilliant ideas on how to work and maintain balance as a group and individually.

URL 410 | tags://john@us.ibm.com/AF24560E410987DFA |

Network Preference: ☐ *Private*  ☑ *Community*  ☐ *Corporate*
                           414              415                 416

[ Save 418 ]   [ Cancel 424 ]

FIG. 4

METHOD OF TAGGING INSTANT MESSAGING (IM) CONVERSATIONS FOR EASY INFORMATION SHARING

BACKGROUND

The present invention generally relates to computer systems and in particular to messaging applications in computer systems. Instant messaging (IM) has become a very popular communication tool in business, educational, and domestic arenas. IM is a quick effective way to correspond locally or long distance with buddies, co-workers, and family members without the commitment of a phone call. Recently, IM has been increasingly utilized in corporate settings to discuss meeting agendas, ideas, frustrations, business solutions as well as leisure chatting. Incredibly useful information is generated daily utilizing IM; however, the information is not easily shared (when desired) with the interested community.

Existing IM systems allow transcripts of communication to be saved in an IM history log. Retrieving IM transcripts or sharing the transcript with the community is virtually impossible after the IM transcript has been logged. Current IM systems allow the IM users to search directly within an IM session, or save an IM session to a text file. After saving the IM session to a text file, the user may utilize a text editor to search the transcript of the IM session. However, text searches are limited to matching nearly exact textual content. A text search may overlook relative information, such as terms implied by context, but not represented explicitly in the text of the IM session.

SUMMARY OF ILLUSTRATIVE EMBODIMENTS

Disclosed is a method, system and computer program product for selecting and tagging content within an instant messaging (IM) session. The content is selected utilizing a contextual pointer, tagged with a subject and/or key words, then assigned a uniform resource locator (URL), and stored as an IM transcript. A search system allows the IM transcript and/or selected content to be indexed according to the tag, title, and word(s)/phrase(s) selected within the content. The IM transcript is retrieved from a location within the network via the assigned URL. IM users may assign accessibility privileges to the URL of the IM transcript, allowing the selected content to be shared via a community and/or corporate network. Private access privileges may be assigned to offer full IM transcript protection.

In one embodiment, when utilizing an IM client, word(s)/phrase(s) may be selected and/or tagged within an IM session. During the IM communication, the user chooses a contextual pointer from a tag palette to select (i.e. highlight, underline, circle, etc.) content within the IM session. The selected content may be deemed useful to the IM transcript creator(s) or a local community at a later time. Content within an IM message are labeled with a descriptive tag and/or title. The title, tag, and selected word(s)/phrase(s) may be utilized to locate the IM transcript within a network of indexed IM transcripts.

In one embodiment, a protocol is provided which allows the content of an IM transcript to be accessed using IM client via an URL. When utilizing the IM client, the user selects the target word(s)/phrase(s) and may assign an URL to the transcript. The IM transcript is indexed according to the word(s)/phrase(s), tag, and/or title of the transcript, and retrieved utilizing the assigned URL identification (ID).

In one embodiment, IM bookmarks are utilized to provide additional labeling of the selected content and to assign accessibility privilege, which enables the tagged conversation content to be shared among social networks and a community. An IM bookmark graphical user interface (GUI) allows the user to further label and describe the selected word(s)/phrase(s). The bookmark GUI also permits the user to assign the preferred network storage location for the IM transcript. The IM user may assign the transcript to a private, community, or corporate network.

BRIEF DESCRIPTION OF THE DRAWINGS

The invention itself will best be understood by reference to the following detailed description of an illustrative embodiment when read in conjunction with the accompanying drawings, wherein:

FIG. 4 illustrates a graphical user interface for assigning a preferred network storage location according to one embodiment of the invention;

DETAILED DESCRIPTION OF AN ILLUSTRATIVE EMBODIMENT

Figure 1:
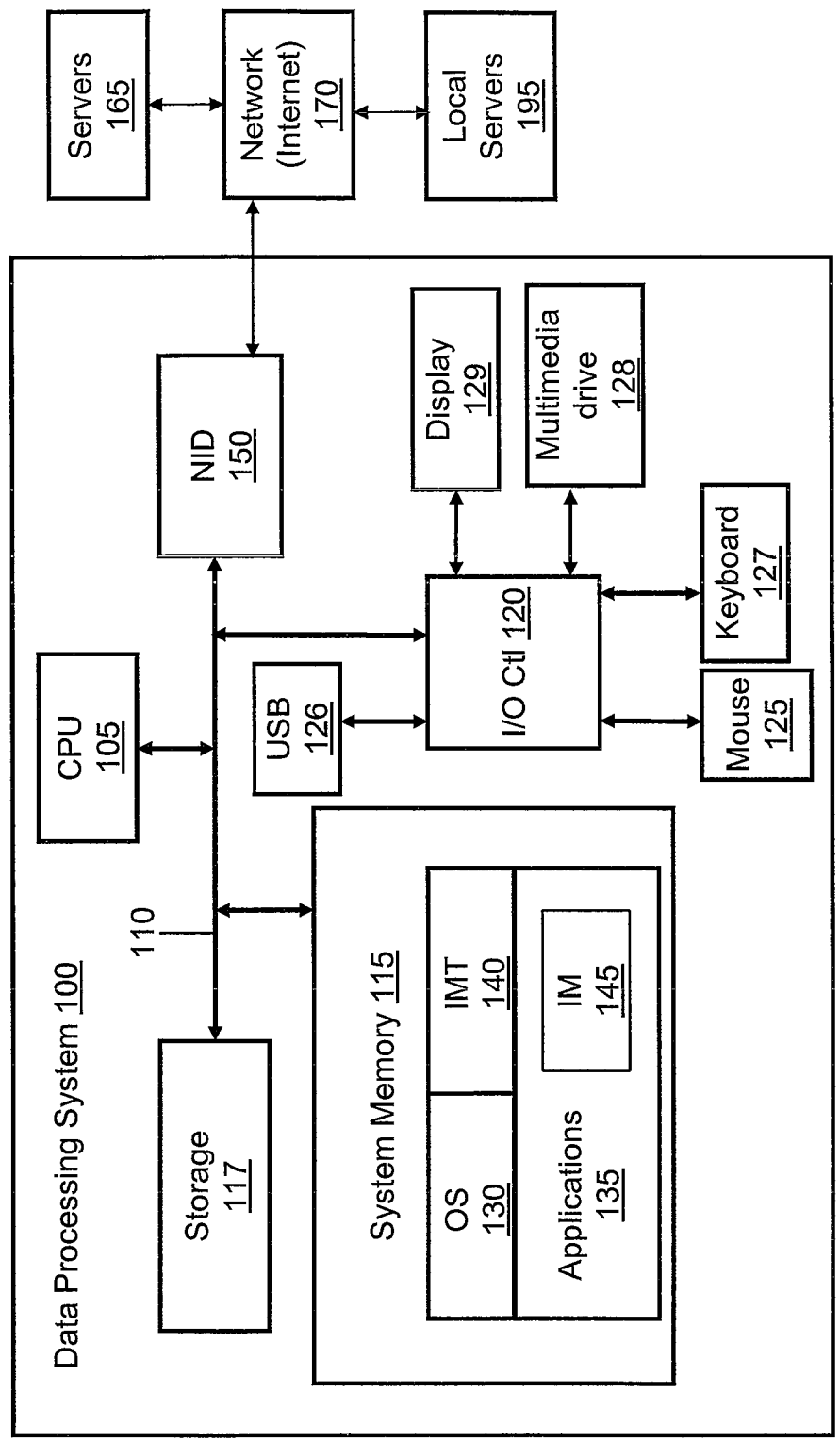
FIG. 1 is a block diagram of a data processing system, within which various features of the invention may advantageously be implemented, according to one embodiment of the invention.

The illustrative embodiments provide a method, system and computer program product for selecting and tagging content within an instant messaging (IM) session. The content is selected utilizing a contextual pointer, tagged with a subject and/or key words, then assigned a uniform resource locator (URL), and stored as an IM transcript. A search system allows the IM transcript and/or selected content to be indexed according to the tag, title, and word(s)/phrase(s) selected within the content. The IM transcript is retrieved from a location within the network via a new IM protocol using the assigned URL. IM users may assign accessibility privileges to the URL of the IM transcript, allowing selected content to be shared via a community and/or corporate network. Private access privileges may be assigned to offer full IM transcript protection.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms "transcript" and "content" depict the written record of the IM communication. Transcript describes the full length document of the IM communication, while content describes word(s)/phrases within the IM transcript.

With reference now to the figures, FIG. 1 depicts a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller. Multimedia drive 128 and USB port 126 may operate as both input and output (storage) mechanisms. DPS 100 also comprises storage 117, within which data/instructions/code may be stored.

DPS 100 is also illustrated with a network interface device (NID) 150, with which DPS 100 connects to local server 195 and one or more remote servers 165 via an access network, such as the Internet 170. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and The Linux Mark Institute, or AIX®, a registered trademark of IBM), applications 135, including instant messaging (IM) client 145, and instant messaging tag (IMT) utility 140. In actual implementation, IM client 145, and IMT utility 140 may be combined as a single application collectively providing the various functions of each individual software component when the corresponding code is executed by the CPU 105. For simplicity, IMT utility 140 is illustrated and described as a stand alone or separate software/firmware component, which provides specific functions within the IM client, as described below.

CPU 105 executes IM client 145, IMT utility 140, as well as OS 130, which supports the user interface features of IM client 145 within IM utility 140. In the illustrative embodiment, IMT utility 140 provides several graphical user interfaces (GUI) to enable user interaction with, or manipulation of, the functional features of the IM client (145) and the utility (140). Among the software code/instructions provided by IMT utility 140, and which are specific to the invention, are: (a) code for selecting IM transcript content; (b) code for tagging selected content within the IM transcript; (c) code for assigning the IM transcript and the tagged content a URL; and (d) code for storing the transcript with tagged content to a network-accessible location for user access. For simplicity of the description, the collective body of code that enables these various features is referred to herein as IMT utility 140. According to the illustrative embodiment, when CPU 105 executes IMT utility 140, DPS 100 initiates a series of functional processes that enable the above functional features as well as additional features/functionality, which are described below within the description of FIGS. 2-7.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
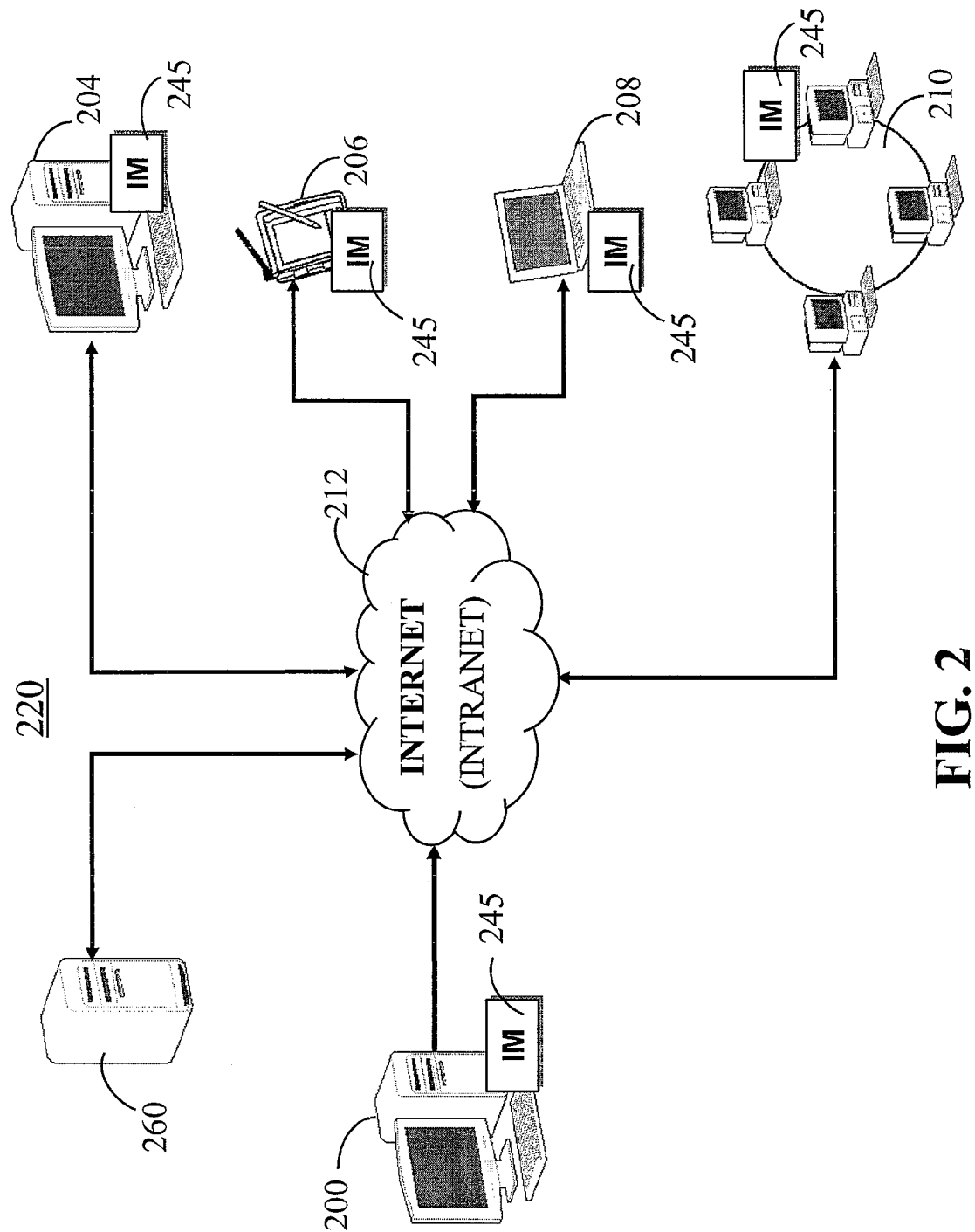
FIG. 2 is a diagram of a network of computers utilizing instant messaging (IM) clients in accordance with one embodiment of the invention.

With reference now to FIG. 2 which illustrates a network of computers that are capable of communicating in real-time via respective IM clients 245 (similar to IM client 145 of FIG. 1). Several computer systems may exist in network 220, including computer 200, desktop computer 204, handheld computer 206, laptop 208, community computers 210, and host server 260. Host server 260 may be a located within a community of computers within network 220. Host server 260 may be a local or remote machine utilized to store IM transcripts with tagged content. Computer 200 communicates with each computer in network 220 utilizing IM client 245 via Internet 212. IM client 245 may be utilized to send and receive messages instantly to one or more computers within network 220 via the Internet or an Intranet.

Community computers 210 are a community of networked computers utilized in a corporate setting for collaboration purposes. The corporate setting may be for educational, business, or leisure purposes. During IM communication, content within the IM transcript on computer 200 are selected and tagged to access at a future time. A URL is assigned to the tagged content and/or IM transcript; however, restrictions may be associated with retrieval of the IM transcript. When restrictions apply to retrieval of an IM transcript, users associated with the IM communication may determine the access privileges of the tagged content and IM transcript.

In one embodiment, computer 200 communicates with desktop computer 204, handheld computer 206, laptop computer 208, and community computers 210, utilizing IM client 245. In the below described implementation, computer 200 and community computers 210 are associated within a single organization; however, desktop computer 204, handheld computer 206, and laptop computer 208 are collaborators within one or more organizations (or corporate communities).

During IM communication, content of the IM transcript are tagged and assigned a URL. The selected content within the IM transcript is indexed according to the IM bookmark information (described below) and may be stored on host server 260.

Figure 3:
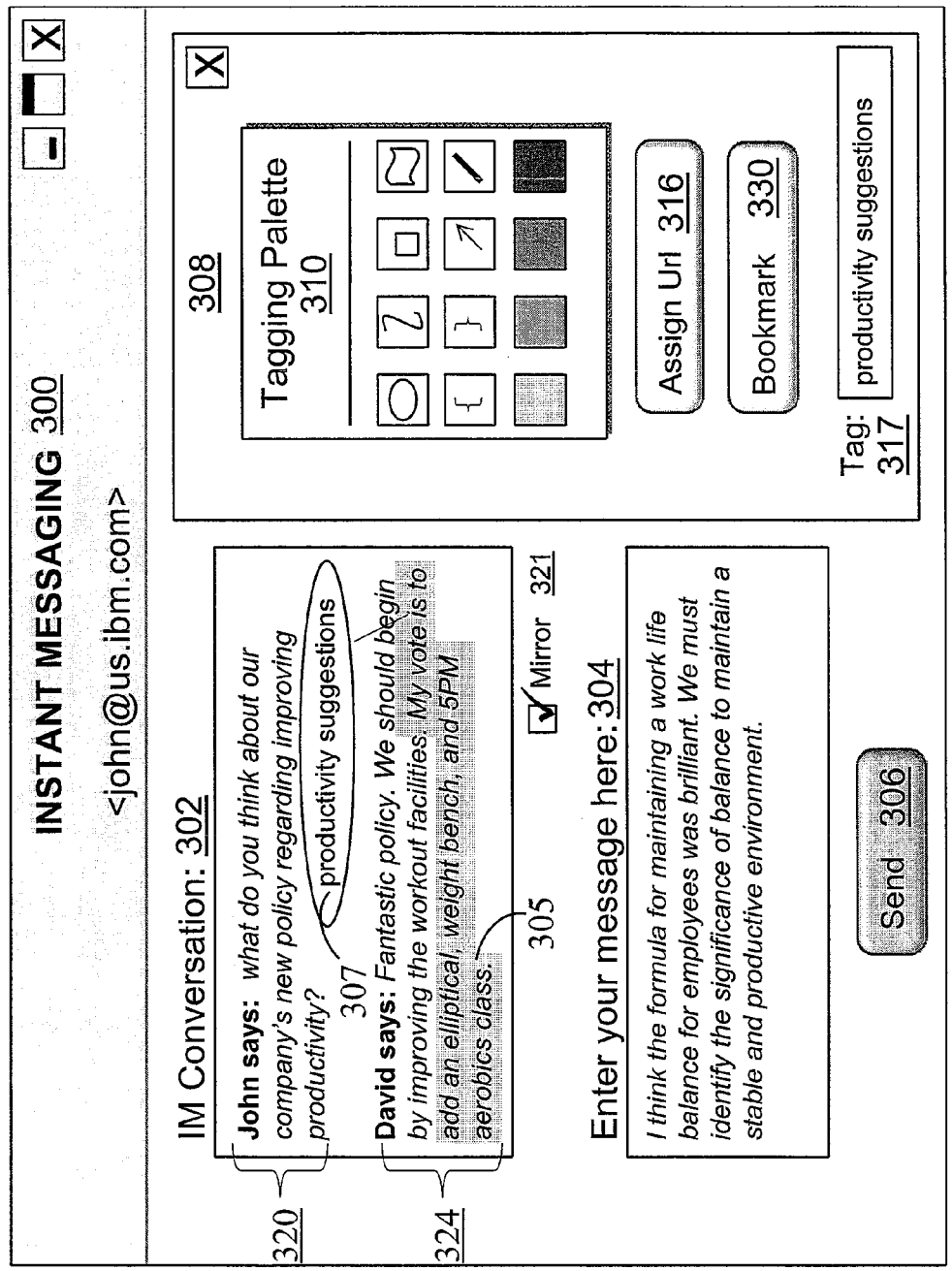
FIG. 3 illustrates a graphical user interface for selecting (i.e. highlight, underline, circle, etc.) and tagging an instant message transcript according to one embodiment of the invention.

FIG. 3 illustrates IM graphical user interface (GUI) 300. IM GUI 300 comprises IM conversation 302, IM message entry 304, and IM send button 306. Tagging palette 310, assign URL button 316, IM bookmark button 330, and tag field 317 within toolbox 308 are utilized to highlight and mark word(s) and/or phrase(s) within IM conversation 302 for future access. When URL button 316 is engaged, a URL is automatically assigned to the most recently tagged content. After engaging bookmark button 330, IM bookmark GUI 400 dynamically appears, allowing the user to further describe the selected content, view the assigned URL and/or assign a new URL, as well as assign security access as described below. In IM conversation 302 an IM communication is displayed between two or more users. Each user, local user 320 and remote user 324 may provide communication in message entry 304. Selected text 305 is highlighted and then tagged with a brief description illustrated as label 307. Selecting mirror 321 allows local user 320 and remote user 324 to view all selections and tags of content within IM conversation 302.

The user may allocate a URL to selected text 305 by engaging assign URL button 316. Assigning a URL provides convenient access to the transcript at a future time. Tagging palette 310 comprises multiple shapes and elements (e.g. ovals, free drawing lines, rectangles, flags, left and right braces, arrows, line segments) as well as highlighting shades (or colors) to mark the information (word(s)/phrase(s)) of interest within the IM transcript. Selecting mirror 321 allows local user 320 and remote user 324 to see the selections and tagging of the IM transcript in real-time. When mirror 321 is not selected, only local user 320 may view text selections and labeling.

In one embodiment, IM client 245 (FIG. 2) is utilized for communication in corporate collaborations. IM GUI 300 of FIG. 3 illustrates communication between local user 320 and remote user 324. IM conversation 302 displays communication between the two users, while message entry 304 contains the text input of local user 320. To ensure convenient access to the information discussed, a highlighting shade is selected from tagging palette 310. The highlighting shade is utilized to identify selected text 305. Assign URL 316 then enables a URL to automatically be assigned to the highlighted selected text 305. A description of the selected text is entered at tag 317 and may be displayed in IM conversation 302 in a distinguished manner (e.g. highlighted, special font, color, flagged, etc.), such as with label 307.

In one embodiment, assign URL 316 is engaged to allocate a URL to selected text 305. URLs are preset and directed to a predefined location. The assigned URL may be based on the user identification. Assign URL 316 may be utilized to assign one or more URLs to selections of text during IM communication. Assign URL 316 may be engaged immediately after selecting and tagging the content of interest, such as selected text 305. Utilizing assign URL during the IM session automatically assigns a URL to the selected content, while minimizing interruption of the IM session. The user may also choose to make multiple selections of content throughout the IM transcript, therefore a description may be input at tag 317 for each selection, and then assigned a single URL to the multiple selected content (before and/or after the IM communication is ended).

In one embodiment, when IM bookmark 330 is engaged, IM bookmark GUI 400 of FIG. 4 is displayed. IM bookmark GUI 400 comprises the following input fields: title 402, tag 417, description 408, and URL 410. Tools 406 consist of font and formatting options for use within description 408. Network preference 412 provides three network options to store the IM transcript and selected content: private network 414, community network 415, and corporate network 416. The completed IM bookmark is stored when save 418 is engaged, and IM bookmark GUI 430 is exited without saving when cancel 424 is engaged.

As illustrated, a bookmark is created for selected text 305 (FIG. 3). In one embodiment local user 320 may choose to store the IM transcript and selected text 305 in a private network by selecting private network 414. Selecting private network 414 restricts access to the transcript and selected content to users that took part in the IM communication. A password may be assigned to access the data associated with the URL allocated to the private IM transcript. Within the private network, neither selected content nor the IM transcript is accessed, without permission of the IM users or a superior administrator.

In one embodiment, choosing community network 414 to store the IM transcript allows the IM transcript to be viewed by a select community of users. In one embodiment, the assigned URL allows IM bookmark information and selected text 305 (FIG. 3) to only be accessible to a select community of users. In an alternate embodiment the IM bookmark information and selected text may be accessible to a corporate community of users (company and/or organization); however, permission to the full IM transcript is restricted to a select community. The community may be defined by an internet protocol (IP) address, buddy list, work group, department, building, floor, room, etc.

In one embodiment, choosing corporate network 416 makes the IM selected content accessible to the corporation and/or organization when utilizing the World Wide Web. When a user has access to the URL assigned to the tagged content, the tagged content and IM transcript may be retrieved. A method to save the selected content and IM transcript to a specific database may also be provided. The database may provide a search engine wherein the IM transcript may be searched by title 402, tag 417, description 408 and/or utilizing the text within the selected content of the IM transcript. IM files stored in a private network (414), community network (415), and/or corporate network (416) may be accessible from the search engine; however, full access to the files is contingent on the network preference assignment. Attempted access of a restricted file is automatically denied if a user is in violation of the network preference.

Figure 5:
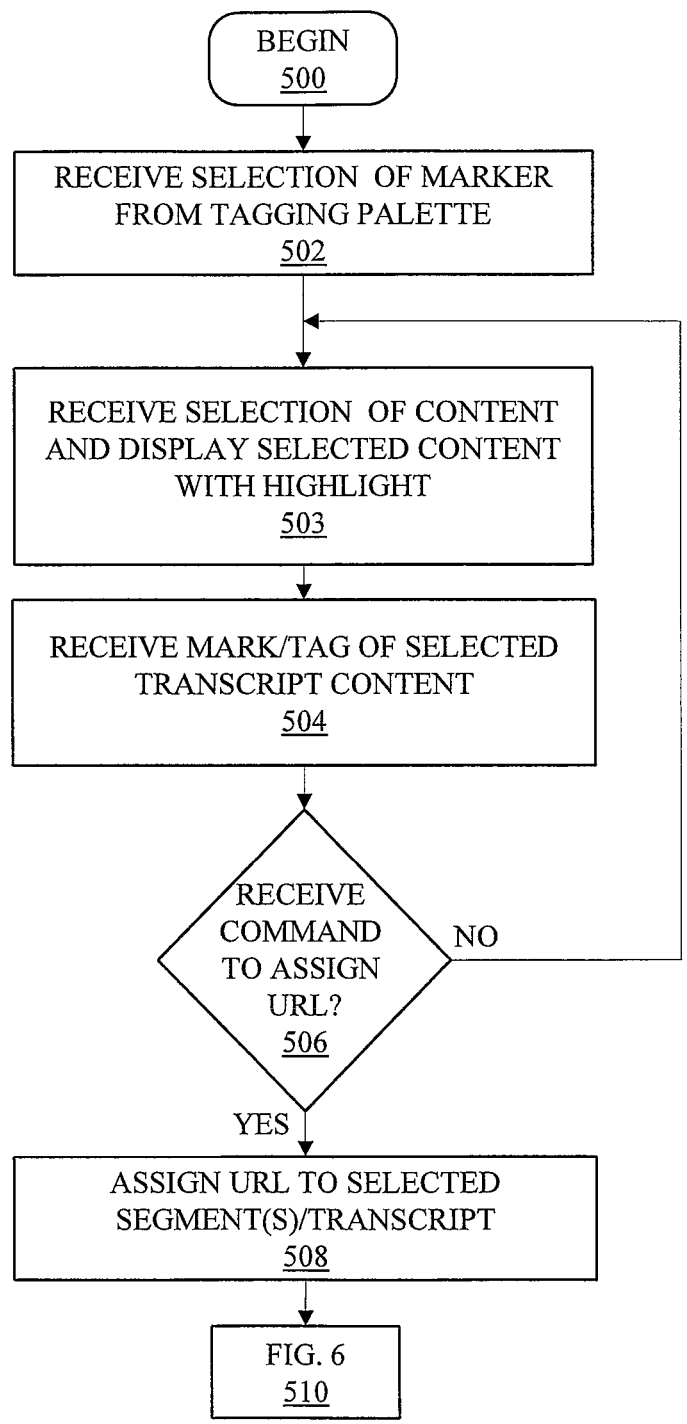
FIG. 5 is a logic flow chart for assigning a URL to an IM transcript in accordance with one embodiment of the invention.
Figure 6:
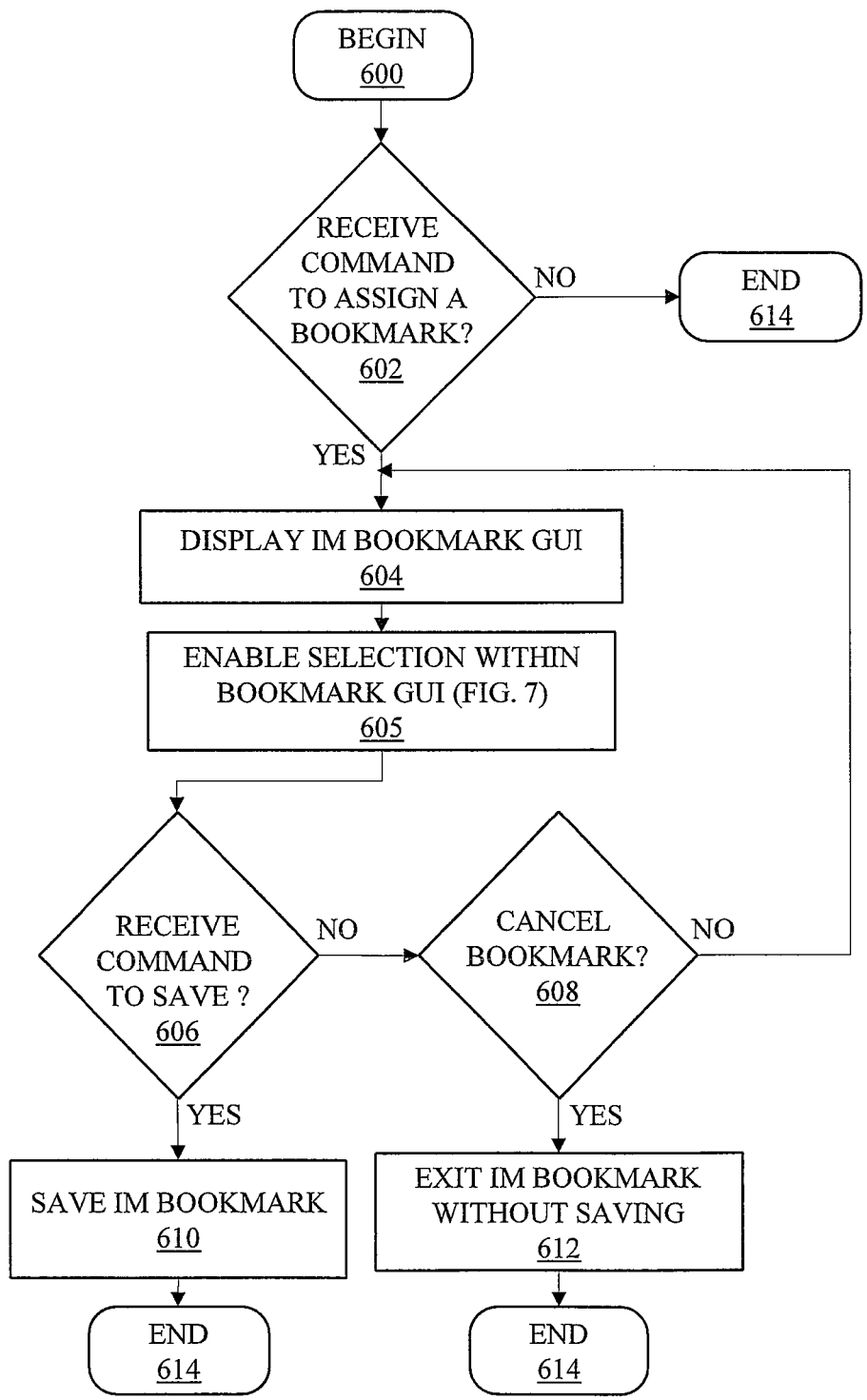
FIG. 6 is a logic flow chart for assigning an IM bookmark according to one embodiment of the invention.
Figure 7:
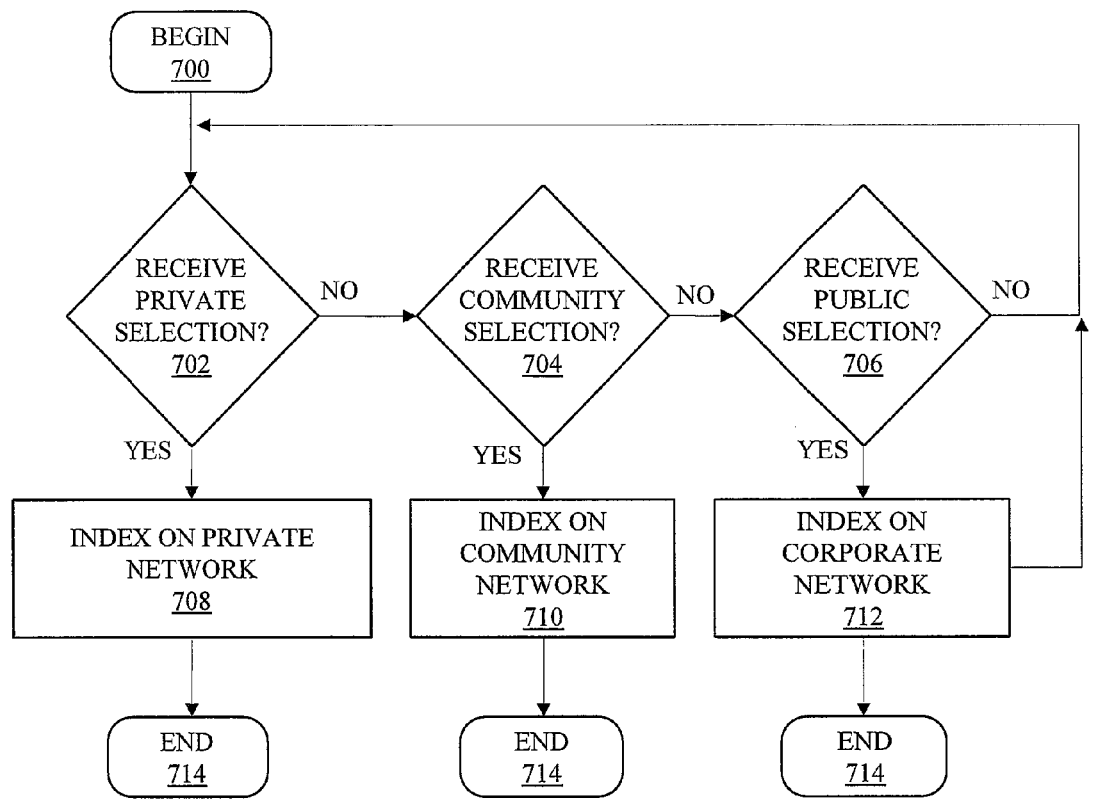
FIG. 7 is a logic flow chart for managing the accessibility of the IM transcript and content according to one embodiment of the invention.

FIGS. 5-7 are flow charts illustrating various methods by which the above processes of the illustrative embodiments are completed. Specifically, the method of FIG. 5 relates to information provided by FIG. 3. The method of FIG. 6 relates to the process of assigning an IM bookmark to one or more of the selected content within the IM transcript. FIG. 7 illustrates the process of assigning a network preference to the tagged IM content and IM transcript. Although the methods illustrated in FIGS. 5-7 may be described with reference to components shown in FIGS. 1-4, it should be understood that this is merely for convenience and alternative components and/or configurations thereof can be employed when implementing the various methods. Key portions of the methods may be completed by IMT utility 140 and IM client 145 executing within DPS 100 (FIG. 1) and controlling specific operations of DPS 100, and the methods are thus described from the perspective of both IMT utility 145 and IM client 140.

IM client 140 is in use on DPS 100, and tagging palette 310 is open on IM GUI 300 when the process of FIG. 5 begins at initiator block 500. The process proceeds to block 502, at which a marker selection is received from tagging palette 310 (FIG. 3). Selection of the marker dynamically initiates IMT utility 145. A selection of the content within the IM transcript is received and displayed with highlighting at block 503. The tagging label for the selected content is received at block 504. At block 506 a decision is made whether a command to assign a URL is received. If the command to assign a URL is received at block 506, a URL is assigned to the selected content and/or the entire IM transcript at block 508. If a command is not received to assign a URL the process returns to block 503.

The process of FIG. 6 begins with block 600 after a URL has been assigned to the selected content and/or IM transcript. A decision is made at block 602, whether a command is received to assign an IM bookmark to the selected content of the IM transcript. If a command is not received to assign a bookmark, the process ends. However, if a command is received to assign a bookmark to the selected content, IMT utility 145 (FIG. 1) automatically displays IM bookmark GUI 430 (FIG. 4). At block 605, IM bookmark GUI 430 enables various selections, such as security settings for the IM transcript or selected/tagged content (as further provided by FIG. 7).

The process of FIG. 7 begins at block 700. A decision is made at block 702 whether to store the selected content/IM transcript as private is received. If the selection is received to store the selected content/IM transcript as private, the selected content/IM transcript is indexed on a private (e.g. password protected or exclusive) network, at block 708. The process then ends at block 714. If the selection is not received to store the selected content/IM transcript as private, the process continues to block 704. At block 704, a decision is made whether a selection to store the selected content/IM transcript on a community network is received. If the selection to store the selected content/IM transcript on a community network is received, the selected content/IM transcript is indexed on the community network at block 710, and the process ends at block 714.

If there is not a selection to store the selected content/IM transcript on a community network, a decision is made at block 706 whether to store the selected content/IM transcript on a corporate network is received. If a selection is received to store on the corporate network, the selected content/IM transcript is indexed on a corporate network at block 712, and the process ends. In the larger implementation, the process actually proceeds to FIG. 6 (block 606), as described above. If the decision is not made to store the selected content/IM transcript on a corporate network, the process returns to block 702.

At block 606, a decision is made whether a command is received to save the IM bookmark. If a command is received to save the IM bookmark, the bookmark is saved according to the selected network preference (selected in FIG. 7), at block 610, and the process ends at block 614. If a command is not received to save the bookmark, the process continues to block 608. At block 608, a decision is made whether a command is received to cancel or close the bookmark GUI. If the command is received to cancel, IM bookmark GUI 430 is exited without saving any selections at block 612, and the process ends at block 614. If the command is not received to cancel, the process returns to block 604.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
   receiving a selection of content within a transcript of an electronic communication, wherein the electronic communication is an instant messaging (IM) communication;
   applying a label to the content selected within the transcript; assigning a unique URL to the content selected from within the transcript; and
   forwarding at least the content selected to a storage location accessible via the unique URL.

2. The method of claim 1, wherein said method further comprising:
   displaying a graphical user interface within which communication is received communication from and send to one or more instant messaging clients;
   enabling selection of a marker utilized to identify content within an instant messaging (IM) transcript;
   detecting selection of one or more characters from within the IM transcript; and
   storing at least one of the selected one or more characters and the IM transcript in a database accessible via one or more networks.

3. The method of claim 1, further comprising:
   dynamically displaying a bookmark graphical user interface (GUI) with selectable options and preferences that may be applied to the content selected and provide additional information about the content selected within the transcript;
   detecting selection of one or more preferences to manage access to the content selected within the transcript, wherein preferences include one or more of: a private network, a community network, and a corporate network; and
   responsive to detecting selection of one of the one or more preferences, assigning the preference selected to the content, wherein the preferences are selected from among: enabling access to the content via a the private network that restricts access of the content to one or more creators of the IM transcript; enabling access to the content via a community network that confines access to at least one of one or more persons, one or more IP addresses, and one or more groups; enabling access to the content via a corporate network that permits access of the content to a registered members within a corporation; and enabling access to the content via a public network that provides open access.

4. The method of claim 1, wherein assigning the unique URL further comprises:
   generating prompts for entry of the unique URL, wherein manual entry of the unique URL is available, wherein said prompts are generated at one or more periods from among: before the selection of the content, wherein a received URL serves as a default, automatically utilized URL for content selected, wherein the default URL may be selectably changed after selection of the content; and after selection of the content, wherein a URL is required to be entered after selection of the content; and
   associating the unique URL with the content and assigning the unique URL to a predefined searchable location.

5. The method of claim 1, further comprising:
   receiving a selection of a network preference for storing the labeled content from among a private network, a community network, a corporate network and a public network, wherein the labeled content is assigned to a corresponding private network, community network, corporate network and public network, respectively;
   dynamically linking the labeled content and associated transcript of the electronic communication to a database in the corresponding network; and
   storing the selected content in a network accessible database according to the network preference selected.

6. The method of claim 5, further comprising:
   indexing the selected content in the database according the label of the selected content and the characters within the selected content;
   establishing access protocols to the selected content within the database according to the selected network; and
   enabling access to the labeled content with one of the unique URL and a search term associated with the selected content, wherein a search engine locates the labeled content in the database via characters found within the selected content or from characters making up the label.

7. An electronic device comprising:
   a processor component;
   an input/output (I/O) mechanism that enables manipulation of content within an instant messaging (IM) client executing on the electronic device;
   a mechanism for transmitting and receiving IM communication from the IM client; and
   a utility associated with the IM client executing on the processor component and which comprises code that enables completion of the functions of:
   receiving a selection of content within a transcript of an electronic communication;
   applying a label to the content selected within the transcript;
   assigning a unique URL to the content selected from within the transcript;
   and forwarding at least the content selected to a storage location accessible via the unique URL.

8. The electronic device of claim 7, said utility further comprising code for:
   interacting with a graphical user interface within which communication is received communication from and send to one or more instant messaging clients;
   enabling selection of a marker utilized to identify content within an instant messaging (IM) transcript;
   detecting selection of one or more characters from within the IM transcript; and
   storing at least one of the selected one or more characters and the IM transcript in a database accessible via one or more networks.

9. The electronic device of claim 7, said utility further comprising code for:
   dynamically displaying a bookmark graphical user interface (GUI) with selectable options and preferences that may be applied to the content selected and provide additional information about the content selected within the transcript;
   detecting selection of one or more preferences to manage access to the content selected within the transcript, wherein preferences include one or more of: a private network, a community network, and a corporate network; and
   responsive to detecting selection of one of the one or more preferences, assigning the preference selected to the content, wherein the preferences are selected from among: enabling access to the content via a the private network that restricts access of the content to one or more creators of the IM transcript; enabling access to the content via a community network that confines access to at least one of one or more persons, one or more IP addresses, and one or more groups; enabling access to the content via a corporate network that permits access of the content to a registered members within a corporation; and enabling access to the content via a public network that provides open access.

10. The electronic device of claim 7, wherein said code for assigning the unique URL further comprises code for:
generating prompts for entry of the unique URL, wherein manual entry of the unique URL is available, wherein said prompts are generated at one or more periods from among: before the selection of the content, wherein a received URL serves as a default, automatically utilized URL for content selected, wherein the default URL may be selectably changed after selection of the content; and after selection of the content, wherein a URL is required to be entered after selection of the content; and
associating the unique URL with the content and assigning the unique URL to a predefined searchable location.

11. The electronic device of claim 7, said utility further comprising code for:
receiving a selection of a network preference for storing the labeled content from among a private network, a community network, a corporate network and a public network, wherein the labeled content is assigned to a corresponding private network, community network, corporate network and public network, respectively;
dynamically linking the labeled content and associated transcript of the electronic communication to a database in the corresponding network; and
storing the selected content in a network accessible database according to the network preference selected.

12. The electronic device of claim 11, said utility further comprising code for:
indexing the selected content in the database according the label of the selected content and the characters within the selected content;
establishing access protocols to the selected content within the database according to the selected network; and
enabling access to the labeled content with one of the unique URL and a search term associated with the selected content, wherein a search engine locates the labeled content in the database via characters found within the selected content or from characters making up the label.

13. A computer program product comprising:
a non-transitory computer readable medium; and
program code on the non-transitory computer readable medium that when executed by a processor provides the functions of:
receiving a selection of content within a transcript of an electronic communication;
applying a label to the content selected within the transcript;
assigning a unique URL to the content selected from within the transcript;
and forwarding at least the content selected to a storage location accessible via the unique URL.

14. The computer program product of claim 13, further comprising code for:
displaying a graphical user interface within which communication is received communication from and send to one or more instant messaging clients;
enabling selection of a marker utilized to identify content within an instant messaging (IM) transcript;
detecting selection of one or more characters from within the IM transcript; and
storing at least one of the selected one or more characters and the IM transcript in a database accessible via one or more networks.

15. The computer program product of claim 13, further comprising program code for:
dynamically displaying a bookmark graphical user interface (GUI) with selectable options and preferences that may be applied to the content selected and provide additional information about the content selected within the transcript;
detecting selection of one or more preferences to manage access to the content selected within the transcript, wherein preferences include one or more of: a private network, a community network, and a corporate network; and
responsive to detecting selection of one of the one or more preferences, assigning the preference selected to the content, wherein the preferences are selected from among: enabling access to the content via a the private network that restricts access of the content to one or more creators of the IM transcript; enabling access to the content via a community network that confines access to at least one of one or more persons, one or more IP addresses, and one or more groups; enabling access to the content via a corporate network that permits access of the content to a registered members within a corporation; and enabling access to the content via a public network that provides open access.

16. The computer program product of claim 13, wherein said code for assigning the unique URL further comprises code for:
generating prompts for entry of the unique URL, wherein manual entry of the unique URL is available, wherein said prompts are generated at one or more periods from among: before the selection of the content, wherein a received URL serves as a default, automatically utilized URL for content selected, wherein the default URL may be selectably changed after selection of the content; and after selection of the content, wherein a URL is required to be entered after selection of the content; and
associating the unique URL with the content and assigning the unique URL to a predefined searchable location.

17. The computer program product of claim 16, further comprising program code for:
receiving a selection of a network preference for storing the labeled content from among a private network, a community network, a corporate network and a public network, wherein the labeled content is assigned to a corresponding private network, community network, corporate network and public network, respectively;
dynamically linking the labeled content and associated transcript of the electronic communication to a database in the corresponding network; and
storing the selected content in a network accessible database according to the network preference selected.

18. The computer program product of claim 17, further comprising program code for:
indexing the selected content in the database according the label of the selected content and the characters within the selected content;
establishing access protocols to the selected content within the database according to the selected network; and
enabling access to the labeled content with one of the unique URL and a search term associated with the selected content, wherein a search engine locates the labeled content in the database via characters found within the selected content or from characters making up the label.

19. The method of claim 1, further comprising displaying a tagging palette for user selection of a contextual pointer to select the content within the electronic communication, wherein the tagging palette comprises a plurality of contextual pointers.

20. The method of claim 1, further comprising receiving a user input to select a mirror setting, wherein the mirror setting allows both a local user and a remote user to see the selection and the tagging of the content in real-time.

* * * * *